United States Patent
Peless et al.

(10) Patent No.: US 6,885,912 B2
(45) Date of Patent: Apr. 26, 2005

(54) AREA COVERAGE WITH AN AUTONOMOUS ROBOT

(75) Inventors: Ehud Peless, Even Yehuda (IL); Shai Abramson, Pardessia (IL); Ronen Friedman, Hod Hasharon (IL); Ilan Peleg, Tsur Yigal (IL)

(73) Assignee: F Robotics Acquistions Ltd., Pardesiya (IL)

( * ) Notice: Subject to any disclaimer, the term of this patent is extended or adjusted under 35 U.S.C. 154(b) by 0 days.

(21) Appl. No.: 10/445,658

(22) Filed: May 27, 2003

(65) Prior Publication Data

US 2003/0208304 A1 Nov. 6, 2003

Related U.S. Application Data

(63) Continuation of application No. 09/700,211, filed as application No. PCT/IL99/00248 on May 11, 1999, now Pat. No. 6,615,108.

(30) Foreign Application Priority Data

May 11, 1998 (IL) .................................................. 124413

(51) Int. Cl.[7] .............................................. G06F 19/00
(52) U.S. Cl. ....................... 700/245; 700/253; 700/254; 700/255; 700/258; 700/262; 700/302; 318/568.12; 318/580; 318/581; 318/587; 180/167; 180/168; 180/169; 701/50; 701/213
(58) Field of Search .............................. 700/245, 253, 700/254, 255, 258, 262, 302, 218; 318/568.12, 580, 581, 587; 180/167, 168; 701/50, 23, 300; 901/1, 46, 47; 414/227

(56) References Cited

U.S. PATENT DOCUMENTS

| | | |
|---|---|---|
| 4,829,442 A | 5/1989 | Kadonoff et al. |
| 4,919,224 A | 4/1990 | Shyu et al. |
| 4,996,468 A | 2/1991 | Field et al. |
| 5,163,273 A | 11/1992 | Wojtkowski et al. |
| 5,170,352 A | 12/1992 | McTamaney et al. |
| 5,204,814 A | 4/1993 | Noonan et al. |
| 5,321,614 A | 6/1994 | Ashworth |
| 5,502,638 A | 3/1996 | Takenaka |

(Continued)

FOREIGN PATENT DOCUMENTS

| | | | |
|---|---|---|---|
| EP | 0 774 702 | | 5/1997 |
| FR | 2685374 A1 | * | 6/1993 |
| JP | 01320510 A | * | 12/1989 |
| JP | 408255018 | | 10/1996 |
| JP | 409128045 | | 5/1997 |
| WO | WO 93/03399 | * | 2/1993 |
| WO | WO 96/38770 | | 12/1996 |

OTHER PUBLICATIONS

Alan, Integrated vision, speech, & action, 1995, Internet, pp. 1–2.*

(Continued)

Primary Examiner—Thomas G. Black
Assistant Examiner—McDieunel Marc
(74) Attorney, Agent, or Firm—Polsinelli Shalton Welte Suelthaus PC

(57) ABSTRACT

There is therefore provided, in accordance with a preferred embodiment of the present invention, a robotic system for systematically moving about an area to be covered. The system includes at least one boundary marker (48) located along the outer edge of the area to be covered, a robot (40) with a navigation system (41) and a sensor unit (43). The navigation system (41) navigates the robot (40) in generally straight, parallel lines from an initial location and turns the robot (40) when the robot (40) encounters one of the boundary markers (48), thereby to systematically move about the area to be covered. The sensor unit (43) senses proximity to one of the at least one boundary marker (48).

10 Claims, 4 Drawing Sheets

U.S. PATENT DOCUMENTS

| | | | |
|---|---|---|---|
| 5,677,836 | A | 10/1997 | Bauer |
| 5,819,008 | A * | 10/1998 | Asama et al. ............... 700/255 |
| 5,928,309 | A | 7/1999 | Korver et al. |
| 5,938,704 | A | 8/1999 | Torii |
| 6,088,644 | A | 7/2000 | Brandt et al. |
| 6,255,793 | B1 * | 7/2001 | Peless et al. ................ 318/580 |
| 6,338,013 | B1 | 1/2002 | Ruffner |
| 6,339,735 | B1 | 1/2002 | Peless et al. |
| 6,417,641 | B1 | 7/2002 | Peless et al. |
| 6,615,108 | B1 * | 9/2003 | Peless et al. ................ 700/245 |
| 2002/0049517 | A1 | 4/2002 | Ruffner |

OTHER PUBLICATIONS

Hicks, et al., A survey of robot lawn mowers, 2000, Internet, pp. 1–8.

Irigoyen, et al., RoboMow evaluation, 2000. Internet, pp. 1–9.

Chandler, et al., The next generation autonomous lawn mower, 2000, Internet, p. 1.

Chandler, et al., LawnSharic A new platform for autonomous mowing and navigation, 1998. Internet, pp. 1–6.

Schelzig, Robomow, Mow, Mow your lawn. Friday, Sep. 22, 2000. Internet/Washington Post, pp. 1–3.

Redazione Internet Magazine, Self operating lawn mower, 2000, Internet. p. 1. (ltportal.it/tech/misc/aalfoperating).

LawnNibbler, the automatic lawn mowing system, 1999, Internet, pp. 1–2 (lawnnibbler.com).

George's Mower Service. Fully automatic lawn mower from george's mower service in Rivernlew Florida. no date. Internet, pp. 1–2.

Ehud Peless, et al., Navigation Method and System for Lawn Mowers and Other Autonomous Machines, U.S. appl. no. 08/554,691, filed Nov. 7, 1985.

Robotic & Automation at Lulea University, Robots at the Robotics department, dated Sep. 20, 2000, Internet (2 pages).

* cited by examiner

AREA COVERAGE WITH AN AUTONOMOUS ROBOT

CROSS REFERENCE TO RELATED APPLICATIONS

This application in a continuation of U.S. patent application Ser. No. 09/700,211, filed Apr. 13, 2001, now U.S. Pat. No. 6,615,108, and is a § 371 of PCT/IL99/00248, filed May 11, 1999. U.S. patent application Ser. No. 09/700,211 and PCT/IL99/00248 are both incorporated by reference herein.

FIELD OF THE INVENTION

The present invention relates to autonomous robots generally and to autonomous robots which move through an area in particular.

BACKGROUND OF THE INVENTION

Autonomous robots are known in the art and have been implemented as household appliances, such as a lawnmower or a vacuum cleaner. These household appliances operate by moving about an area to be processed such that the entire area is covered by the end of the operation.

Reference is now made to FIGS. 1A and 1B, which illustrate the operation of one exemplary autonomous robot, described in U.S. patent application (Ser. No.) 08/554,691, filed 7 Nov. 1995, now U.S. Pat. No. 6,255,793, and assigned to the common assignees of the present invention. U.S. patent application (Ser. No.) 08/554,691 is incorporated herein by reference. FIG. 1A illustrates the area in which the robot 10 operates and FIG. 1B illustrates the elements, in block diagram form, of robot 10.

The autonomous robot 10 operates within an area marked with boundary markers 12A. If there are fixed obstacles 14 in the area, such as flower beds, trees, columns, walls, etc., these obstacles are rimmed with further boundary markers 12B. The boundary markers 12 can be of any suitable type, such as an electrified wire, bar coded posts, a radioactive posts, etc. The term "marker" will be used herein for both posts and wires.

As shown in FIG. 1B, the robot 10 includes a navigation system 20 which receives data from an edge sensor 22 which senses when the robot 10 approaches a boundary marker 12 where, if the marker is a continuous wire, the term "marker" indicates the section of the wire near the current location of the robot. The navigation system 20 also receives data from an odometer 24 which measures the distance the robot 10 has moved and a compass 26 which measures the current location of the robot 10.

Initially, the robot 10 is placed within the area to be covered. The robot 10 moves toward the boundary (if it did not begin near it) and then, as indicated by arrows 32, moves along the boundary, following the boundary markers 12. During this process, the robot 10 uses the location information from the compass to produce a map 28 (FIG. 1B) of the area to be covered.

Once the map is complete, the robot 10 moves about the area to be covered. Whenever it approaches a boundary marker 12, as sensed by the edge sensor 22, the robot 10 changes direction and continues until it reaches another boundary marker 12. If the boundary marker 12 appeared close to, but not at, its expected position, navigation system 20 updates the map 28 to match the new information.

If the boundary marker 12 is sensed substantially within the area, as determined by a comparison of the output of the compass 26 and the information in the map 28, the boundary marker 12 must be one which surrounds the obstacle 14. The robot 10 changes direction and continues until it reaches another boundary marker 12. The robot 10 moves about the area to be covered until it has determined that all sections of the map 28 have been covered.

However, it will be appreciated that creating the map 28 of the shape of the area to be covered is time consuming. Due to the inaccuracies of the compass 26 arid odometer 24, it is also typically error prone.

SUMMARY OF THE INVENTION

Applicants have realized that, if the robot works systematically within the area to be covered, there is no need to create the map.

It is therefore an object of the present invention to provide an autonomous robot, for performing area coverage, which does not create a map of the area to be covered.

There is therefore provided, in accordance with a preferred embodiment of the present invention, a robotic system for systematically moving about an area to be covered. The system includes at least one boundary marker located along the outer edge of the area to be covered, a robot with a navigation system and a sensor unit. The navigation system navigates the robot in generally straight, parallel lines from an initial location and turns the robot when the robot encounters one of the boundary markers, thereby to systematically move about the area to be covered. The sensor unit senses proximity to one of the at least one boundary marker.

Additionally, in accordance with a preferred embodiment of the present invention, the sensor unit includes a unit for indicating proximity to an obstacle within the area to be covered and the navigation system includes a unit for turning the robot when the unit for indicating indicates proximity to an obstacle.

Moreover, in accordance with a preferred embodiment of the present invention, the unit for indicating is either a contact sensor or a proximity sensor.

Further, in accordance with a preferred embodiment of the present invention, the navigation system includes a unit for counting the number of laps needed to cover the area between an obstacle and a boundary marker.

Still further, in accordance with a preferred embodiment of the present invention, the system includes at least one obstacle marker located along the outer edge of the obstacle.

Moreover, in accordance with a preferred embodiment of the present invention, the at least one boundary marker is an electrified wire receiving a first signal and the at least one obstacle marker is an electrified wire receiving a second signal.

Alternatively, in accordance with a preferred embodiment of the present invention, the at least one boundary marker is a post having a first bar code and the at least one obstacle marker is a post having a second bar code.

There is also provided, in accordance with a preferred embodiment of the present invention, a robotic system for systematically moving about an area to be covered. The system includes at least one boundary marker located along the outer edge of the area to be covered, at least one obstacle marker located along the outer edge of an obstacle within the area to be covered, a robot for moving about the area to be covered and a sensor unit for sensing proximity to the boundary and obstacle markers and for differentiating between the boundary and obstacle markers.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1A:
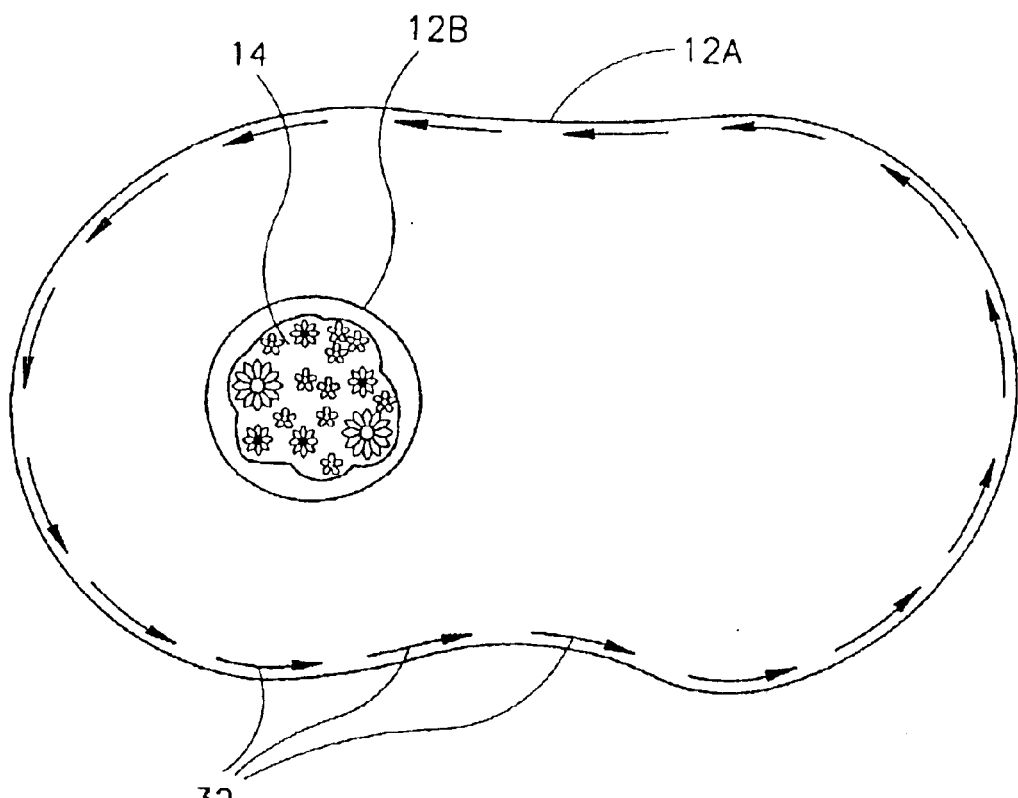
FIG. 1A is a schematic illustration of an area to be covered and the initial movement of a prior art robot within the area.
Figure 1B:
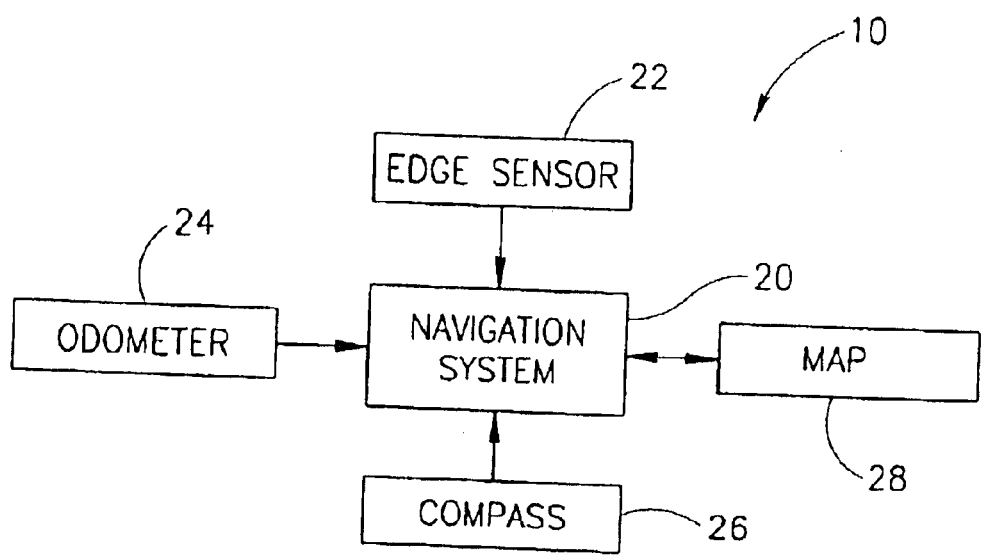
FIG. 1B is a block diagram illustration of the prior art robot.
Figure 2A:
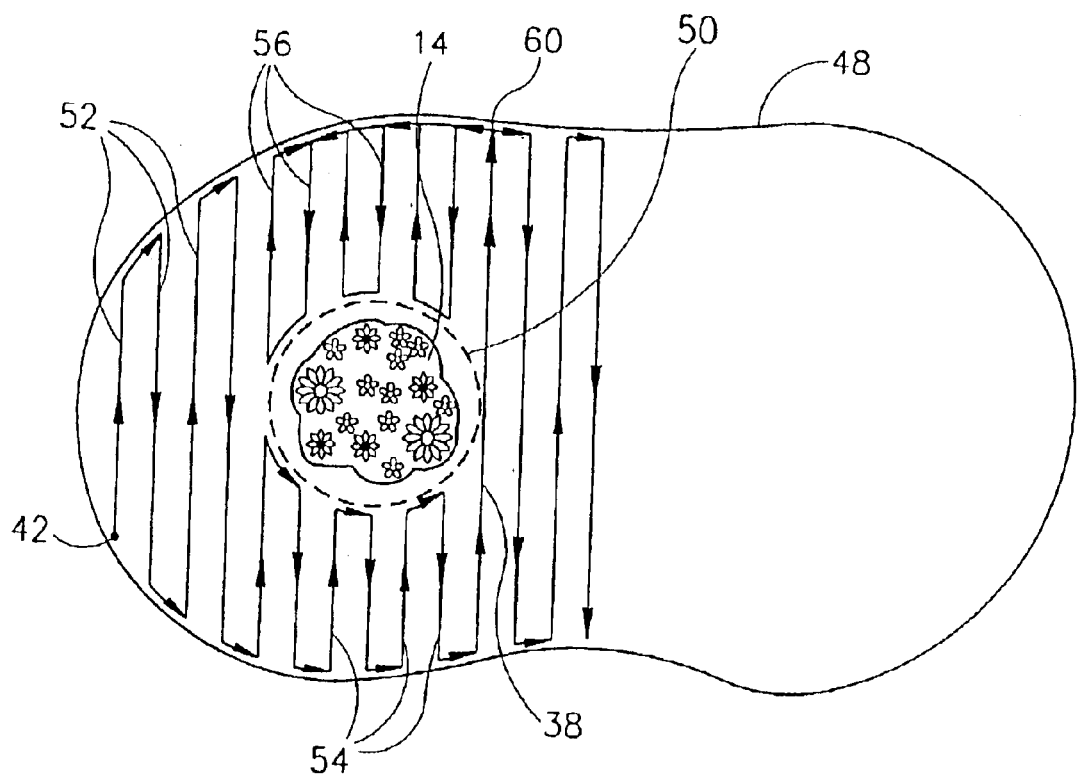
FIG. 2A is a schematic illustration of an area to be covered and the movement of a robot of the present invention within the area.
Figure 2B:
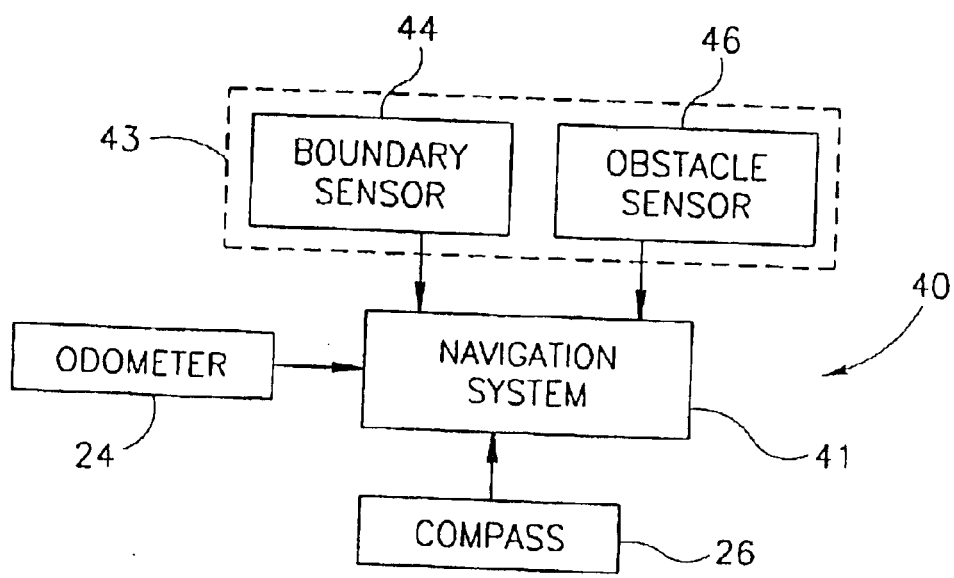
FIG. 2B is a block diagram illustration of a robot, constructed and operative in accordance with a preferred embodiment of the present invention.

Reference is now made to FIGS. 2A and 2B which illustrate the movement of a robot 40 of the present invention and the elements of the robot, respectively. Similar reference numerals refer to similar elements.

In accordance with a preferred embodiment of the present invention, robot 40 does not create a map of the area to be covered. Instead, it systematically scans within the area, moving in a straight direction from one boundary marker to the next. To do so, it must initially be placed relatively close to one extreme edge of the boundary, for example at starting point 42, and faced in the desired direction of scanning.

As can be seen in FIG. 2B, the robot 40 utilizes the odometer 24 and compass 26 but comprises a navigation system 41 and a sensor system 43, shown as two sensors 44 and 46, for separately sensing the boundary and the obstacles, respectively. Accordingly, there can be two different types of markers, boundary markers 48 and obstacle markers 50. The boundary markers 48 and obstacle markers 50 can be of any suitable types, as detailed hereinbelow.

Alternatively, for obstacles which stick above the ground, such as trees and furniture, the obstacle sensors can be proximity and/or contact sensors. For this system, there is no need for obstacle markers and only boundary markers are utilized.

It will be appreciated that, without a map, robot 40 does not know its position within the area to be scanned; it only knows its absolute position. Using position information, robot 40 scans the area, moving in a generally straight line from one marker to the next, as determined by sensor system 43. Using the output of compass 26, the navigation system 41 then turns robot 40 generally 180° whenever it encounters a new marker. The navigation system 41 also ensures that the new "lap" is beside, and possibly slightly overlapping, the previous lap, thereby to ensure full coverage of the area to be covered. This is described in detail in U.S. patent application Ser. No. 08/554,691.

In general, robot 40 moves in generally straight, parallel lines between two boundary markers 48, as indicated by arrows 52. However, if sensor system 43 indicates that the robot 40 is close to an obstacle marker 50, the navigation system 41 causes the scan to occur between boundary markers 48 and obstacle markers 50, as indicated by arrows 54, counting the number of laps until the obstacle is passed.

The next lap, arrow 38, brings the robot 40 to a boundary marker 48 on the other side of the obstacle 14. The robot 40 then performs a scan in the opposite direction, between the boundary markers 48 and the obstacle markers 50, to cover the area behind the obstacle 14. This scan is shown with arrows 56 and involves the same number of laps as for the first side of the obstacle 14.

Once the scan behind the obstacle 14 is finished, the robot 40 follows the boundary markers 48 until it reaches the point, labeled 60, where it began the scan behind the obstacle 14, at which point, it continues normal scanning between boundary markers 48.

Alternatively, the scan behind the obstacle 14 can be performed without counting laps. Instead, the scan continues until the obstacle 14 has been passed. This requires noting the location of the robot 10 near the boundary when the robot 10 begins the scan behind the obstacle 14 so that the robot 10 can be returned to that location once the scan behind the obstacle 14 is finished.

It will be appreciated that, by scanning systematically between boundary and obstacle markers, the present invention covers the area to be covered without having to produce a map of the area.

Figure 3A:
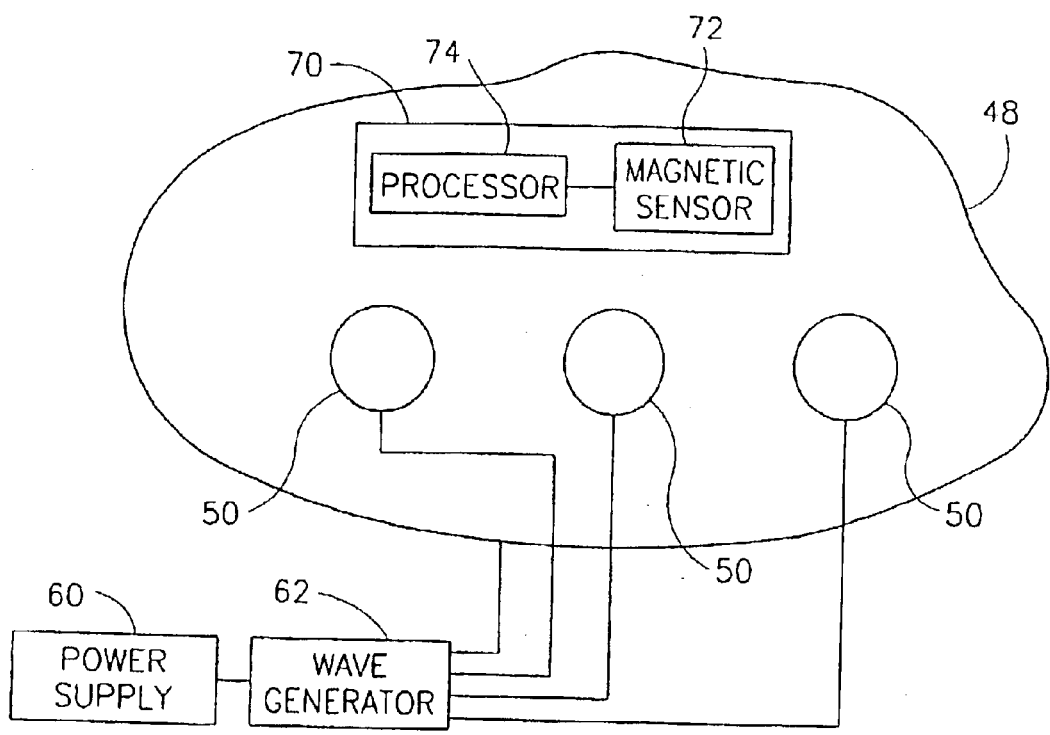
FIG. 3A is a schematic illustration of one embodiment of boundary and obstacle markers.
Figure 3B:
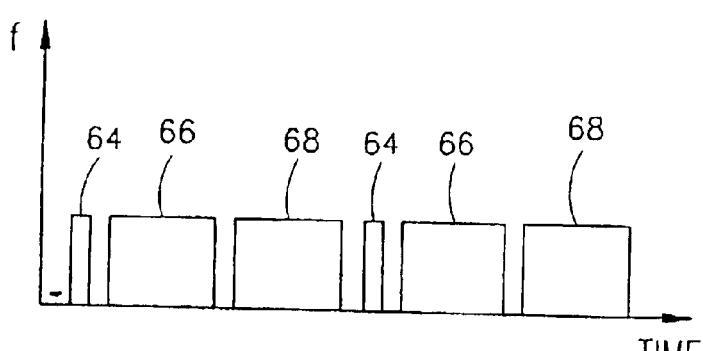
FIG. 3B is a timing diagram operative for the embodiment of FIG. 3A.
Figure 3C:
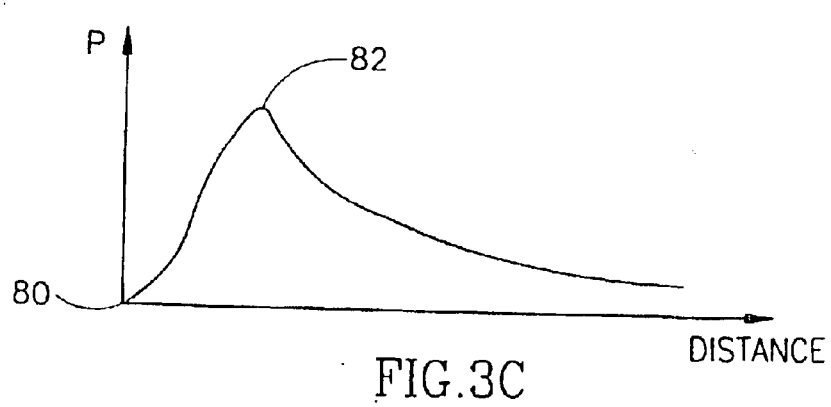
FIG. 3C is a graphical illustration of the signal strength of a magnetic sensor as a function of distance from the markers of FIG. 3A.

Reference is now made to FIGS. 3A, 3B and 3C which respectively illustrate one set of boundary and obstacle markers formed of wires, a timing diagram for the markers and a graph of signal strength as a function of distance from the wire.

In this embodiment, both the boundary marker 48 and the multiple obstacle markers 50 are formed of wires connected to a power supply 60 via a wave generator 62. The wave generator 62 provides one type of signal for the boundary marker 48 and another type of signal to all of the obstacle markers 50.

For example, the signal for marker 48 might be of one frequency while the signal for markers 50 might be of a second frequency. In this embodiment, the wave generator 62 includes two separate elements, each of which produces one of the two frequencies and provides it to the appropriate set of wires.

Alternatively and as shown in FIG. 3B, the signals can be time shared. In this embodiment, a short synchronization pulse 64 is followed by a boundary signal 66 for marker 48 after which an obstacle signal 68 for markers 50 is provided. The sequence repeats. The marker is determined to be a boundary marker or an obstacle marker by the length of time from the most recent synchronization pulse 64.

It will be appreciated that, for both embodiments, the robot, labeled 70, has a single magnetic sensor 72 for sensing the signals from wave generator 62 and a processor 74 for determining if the type of signal based on the frequency of the transmission, in the first embodiment, or based on the timing of the transmission, in the second embodiment. Alternatively, for the second embodiment, the robot 70 can have separate receivers, each tuned to the relevant frequency, and separate processors for each receiver to determine if the received signal is strong enough to indicate proximity.

FIG. 3C schematically illustrates the strength of the signal as a function of distance from the location of the wire. When the sensor 72 is on top of the wire, no signal is received (point 80). As the sensor 72 moves away from the wire, the signal increases sharply, reaching a peak 82 within 50 cm. The signal then slowly decays as the sensor 72 moves further away from the wire. Thus, as the robot 70 approaches the wire, the signal will slowly increase in strength. Acceptable proximity can be defined as once peak 82 has been reached or any time after peak 82 has been reached.

Figure 4:
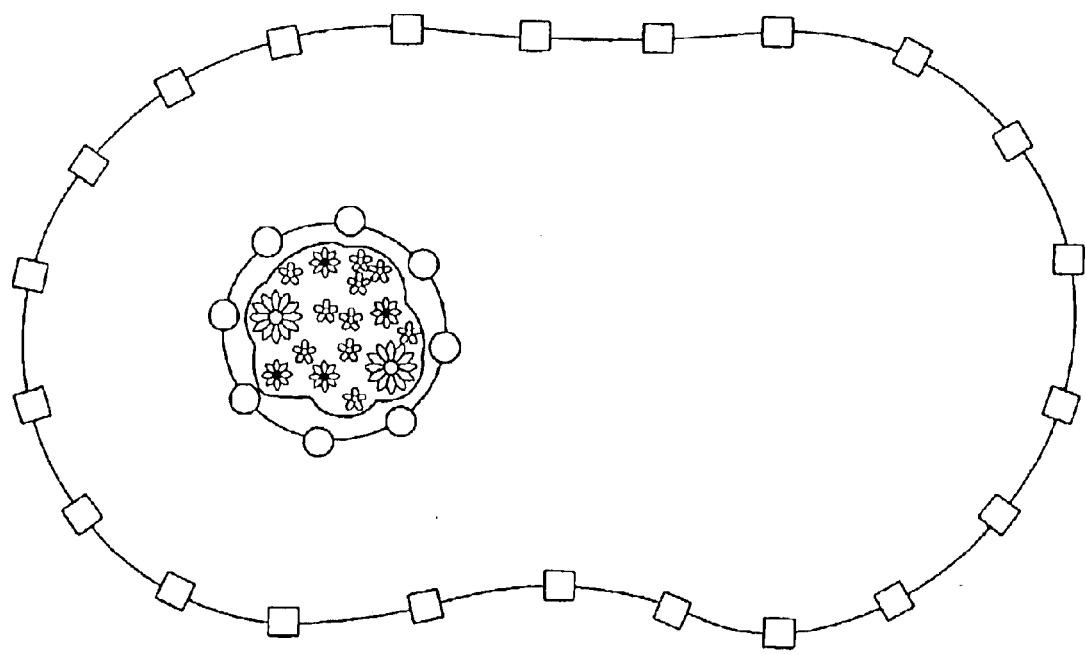
FIG. 4 is a schematic illustration of an alternative embodiment of boundary and obstacle markers.

Reference is now made to FIG. 4 which illustrates an alternative embodiment of the boundary and obstacle markers 48 and 50, respectively. In this embodiment, the markers are formed of posts, each having a different bar code written thereon. FIG. 4 uses squares to indicate the boundary markers 48 and circles to indicate obstacle markers 50. In this embodiment, as in the previous embodiment, there is a single sensor. In this case, the sensor is a bar code reader which provides one type of signal when it reads the boundary marker code and another type of signal when it reads the obstacle marker code.

Alternatively, the boundary markers 40 can be formed of a wire and the obstacle markers can be formed of bar coded posts, or vice versa. A further alternative, discussed hereinabove, uses markers only for the boundary and contact or proximity sensors for sensing the proximity of an obstacle.

It will be appreciated that the markers can be formed of any suitable marking unit and that the robot includes a sensor or sensors capable of recognizing the information which the marking unit provides to determine proximity. Such sensors and marking units are discussed in detail in U.S. patent application Ser. No. 08/554,691. The number of sensors used is of little importance to the present invention; however, the information from the types of sensors must be separatable.

It will be appreciated by persons skilled in the art that the present invention is not limited by what has been particularly shown and described herein above. Rather the scope of the invention is defined by the claims that follow:

What is claimed is:

1. A method for operating a robot comprising:
   moving the robot over a surface initially in accordance with a first scanning mode;
   detecting an obstacle;
   moving the robot so as to follow the obstacle in accordance with a second scanning mode; and,
   returning to the first scanning mode when the robot is beyond the obstacle.

2. The method of claim 1, wherein the second scanning mode includes detecting the obstacle and turning the robot in response to the obstacle being detected.

3. The method of claim 2, wherein the second scanning mode additionally includes moving the robot away from the obstacle after the robot has turned.

4. The method of claim 2, wherein turning the robot includes turning the robot approximately 180 degrees.

5. The method of claim 1, wherein the first scanning mode includes moving the robot in substantially straight lines, substantially parallel to each other.

6. The method of claim 1, additionally comprising:
   operating the robot for lawn mowing.

7. The method of claim 1, additionally comprising:
   operating the robot for vacuum cleaning.

8. A robot for moving about an area to be covered, the robot comprising:
   a navigation system;
   a boundary sensor for sensing proximity to a boundary marker;
   an obstacle sensor for indicating proximity to an obstacle within said area to be covered; and
   said navigation system programmed to navigate said robot in a pattern of generally straight,
   parallel lines turning said robot when said robot senses a boundary marker or an obstacle.

9. The robot of claim 8, wherein said navigation system is additionally configured to count the number of laps needed to cover the area between an obstacle and a boundary marker.

10. The robot of claim 8, wherein said navigation system is additionally configured to note a position of said robot prior to covering an area behind an obstacle, to enable said robot to return to the position after covering said area behind said obstacle.

* * * * *